(No Model.)

J. C. SCHROEDER.
BRICK CUTTING MACHINERY.

No. 505,678.  Patented Sept. 26, 1893.

2 Sheets—Sheet 1.

Witnesses,
Richard L. Frost.
Albert U. Mauzy

Inventor,
John C Schroeder
by George R Ray Atty (No Model.) 2 Sheets—Sheet 2.

J. C. SCHROEDER.
BRICK CUTTING MACHINERY.

No. 505,678. Patented Sept. 26, 1893.

Witnesses,
Richard L. Frost.
Albert U. Mauzy

Inventor,
John C Schroeder
by George R Ray Atty

UNITED STATES PATENT OFFICE.

JOHN C. SCHROEDER, OF ONEKAMA, MICHIGAN.

BRICK-CUTTING MACHINERY.

SPECIFICATION forming part of Letters Patent No. 505,678, dated September 26, 1893.

Application filed March 14, 1893. Serial No. 465,952. (No model.)

*To all whom it may concern:*

Be it known that I, JOHN C. SCHROEDER, a citizen of the United States, residing at Onekama, in the county of Manistee and State of Michigan, have invented certain new and useful Improvements in Brick-Cutting Machinery; and I do hereby declare that the following is a full, clear, and exact description of the invention, which will enable others skilled in the art to which it appertains to make and use the same.

My invention has for its object to provide a brick cutting machine which will be simple in construction, economical with the clay, and at the same time very rapidly or quickly operated. This object is accomplished by mounting the machine on wheels, that in turn run on rails thus enabling the operator to run the machine at any desired distance to or from the pug-mill molding-die or exit orifice to compensate for the varying lengths of the slabs of clay that issue therefrom.

A further object of my invention is to provide a machine that will cut the brick of an even width or thickness. This object is accomplished by fastening a gage to the framework of the machine just below the clay-slab-table and fastening another similar gage to the frame-work of said machine far enough above the said clay-slab-table to allow a slab of clay to pass under it, when said slab of clay is to be cut into bricks. The cutting-wires are passed through the said gages, which keep them at an even, and at the desired distance apart.

The details of the invention will be hereinafter particularly described and pointed out in the claims.

Figure 1:
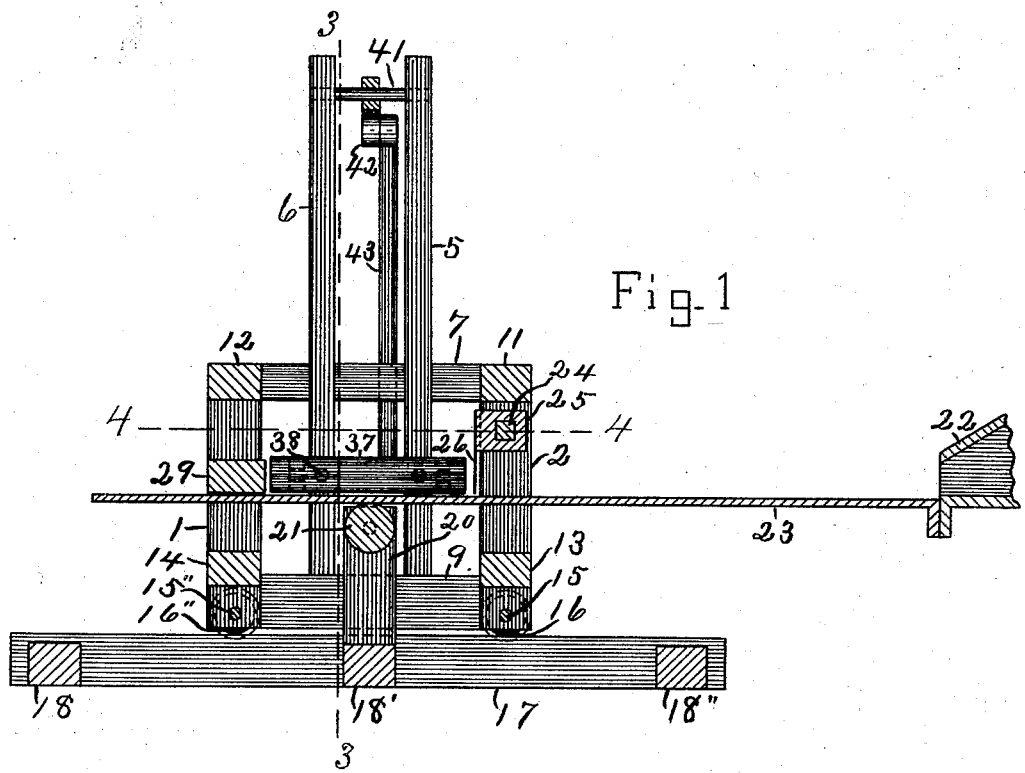
Figure 2:
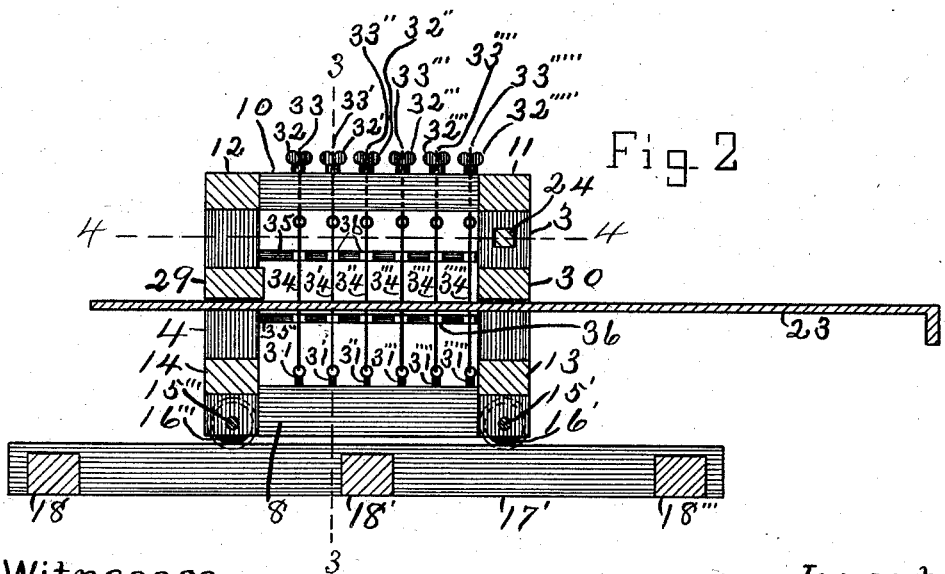
Figures 3, 4:
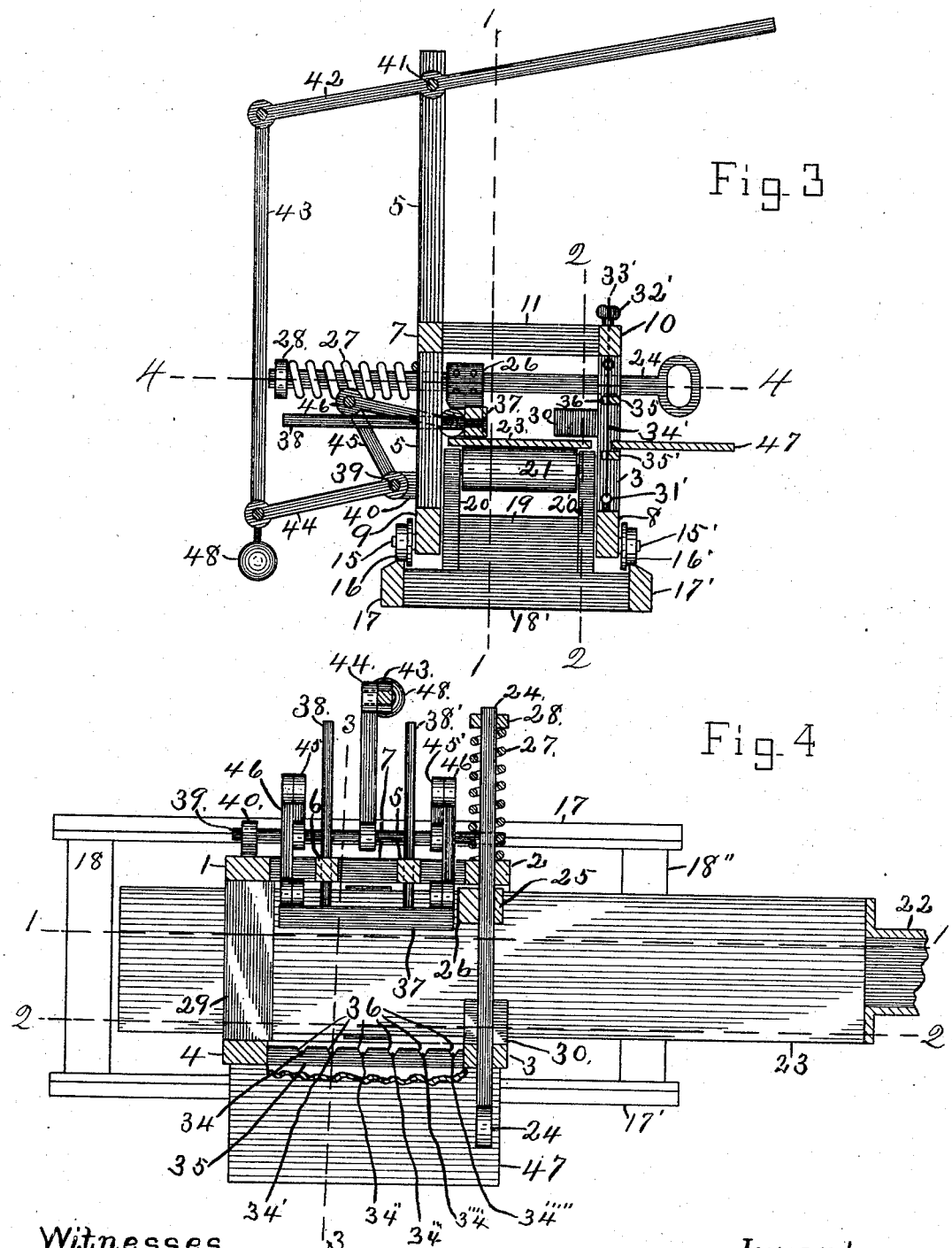

Referring to the drawings Figure 1, represents a vertical longitudinal section of my brick cutting machine, on the line 1—1 of Fig. 3, looking toward the left; and on the line 1—1 of Fig. 4 and looking upward. Fig. 2, represents a vertical longitudinal section of my brick cutting machine, on the line 2—2 of Fig. 3, and looking toward the right, and also on the line 2—2 of Fig. 4, and looking downward. Fig. 3, represents a vertical cross-section of my brick cutting machine, on the line 3—3 of Fig. 1, and on the line 3—3 of Fig. 2, and also on the line 3—3 of Fig. 4 and looking in each figure to the right. Fig. 4, represents a horizontal section on the line 4—4 in Figs. 1, 2, and 3, and looking downward.

Similar numerals refer to similar parts throughout the several views.

The numerals 1, 2, 3, 4, 5, 6, 7, 8, 9, 10, 11, 12, 13, and 14, represent timbers that are securely fastened together and form the main frame of the machine. Near the ends of the said timbers 8 and 9 are securely fastened the axles 15 and 15' upon the ends of which are mounted and journaled the wheels 16, 16', 16'' and 16'''.

17, and 17' represent long timbers or rails, that are securely fastened together by the smaller timbers or ties 18, 18', and 18''. To the small timber or tie 18' is securely fastened the timber 19 and the upright timbers 20 and 20'.
21, represents a roller and it is journaled in the ends of the small upright timbers 20 and 20'.

22, represents a molding die or exit orifice from an ordinary pug-mill.
23 is a table upon which the slab or stream of clay lies and slides that is to be cut into bricks. One end of said table 23, is bolted or otherwise securely fastened to the molding-die or pug-mill, and the other end rests upon the roller 21.

24 represents a square shaft with a handle on one end, and said shaft is suitably journaled in the timbers 2 and 3, and arranged to slide endwise or longitudinally in said journals. On the said square shaft 24, is securely fastened the metal block 25. To this metal block 25 is securely fastened the cutting knife 26. On the said square shaft 24 is placed the coil spring 27, and also the collar 28, used to keep the proper tension on the coil spring 27, which in turn is to keep the knife 26 (when not in use), back against the frame timber 2.

29, represents a gage, which is securely fastened to the frame timbers 1, and 2, and against which the end of the slab of clay comes to be cut.

30, represents a gage-block securely fastened to the frame timber 3, and against which the edge of the slab of clay rests when it is to be cut by the cutting knife 26. 31, 31', and so on represent eye bolts, one end of each of them is securely fastened to the timber 8.

32, 32', and so on represent thumb screws.

33, 33' and so on represent long screws with an eye on one end of each of them and the other ends are threaded and passed through holes in the frame timber 10, and the thumb screws 32, 32' and so on are screwed on to them.

34, 34', and so on represent small steel wires, one end of each is securely fastened to the eye bolts 31, 31' and so on while the other ends of the said wires 34, 34' and so on are securely fastened to the eyes in the screws 33, 33' and so on. Said thumb screws 32, 32' and so on are used to tighten the steel wires 34, 34' and so on to the proper or desired tension.

35 and 35' represent gages, provided with the V slots, 36, 36 and so on through which the wires 34, 34' and so on are stretched. The said gages 35 and 35' are securely fastened to the frame timbers 3 and 4. By stretching the wires 34 and 34' and so on through these gages 35 and 35' I am enabled to keep the wires exactly the same distance apart under all circumstances.

37, represents a plunger used to push the slab of clay to be cut into bricks through the wires 34, 34', and so on as the said plunger 37 moves transversely back and forth on the table 23.

38 and 38' represent guide-rods, one end of each is securely fastened to the plunger 37, and they are in turn journaled in the main frame timbers 5 and 6 and travel longitudinally therein.

39 represents a shaft journaled in the boxes 40, and 40'. The box 40', however, is secluded from sight in Fig. 4 by the square shaft 24 and the spring 27, and said box 40' is also secluded from sight in Fig. 3 by the end of the connecting-rod 44 and the box 40.

41 represents a short shaft the ends of which are fastened to the frame timbers 5 and 6.

42, represents a lever and it is in turn journaled on the shaft 41.

The numerals 43, 44, 45 and 46 represent connecting-rods and all having their ends respectively journaled to each other in an ordinary manner.

47 represents a table securely fastened to the outside of the main frame of the machine upon which the finished bricks are delivered by the machine.

The operation of the machine is as follows: The slabs of clay issue in varying lengths from the molding-die or exit orifice 22 (of an ordinary pug-mill), upon the table 23, and the machine is then moved to the right or left in Figs. 1, 2 and 4 by rolling said machine upon the rails or track 17 and 17' until the gage 29 just touches the end of the slab of clay upon the table 23. Then the handle of the square shaft 24 is pulled, which causes the knife 26 to travel transversely over the table 23 and cut a slice of clay off from the slab of clay on the table 23, sufficient to cut exactly as many bricks as there are steel cutting wires 34, 34' and so on in the machine. Then the lever 42 in Fig. 3 is pulled downward, which causes the properly journaled connecting rods 43, 44, 45, and 46, to move the plunger 37, transversely upon the table 23 which will in turn, push the slice of clay that was cut off by the knife 26, against the small steel wires 34, 34' and so on and cause the wires 34, 34' and so on to cut the said slice of clay into bricks and said finished or cut bricks will then be left upon the secondary table 47. When the operator lets go of the lever 42, the weight 48 attached to the connecting rod 43 will draw the plunger 37 back out of the way of the next slab of clay that is to be cut. When the pug-mill again shoves the slab of clay out farther longitudinally upon the table 23 in Fig. 4 the operator will repeat the above mentioned operations and so on.

The object of mounting the machine upon the wheels 16, 16', 16'', 16''' and running them upon the track or rails 17 and 17' is to enable the operator to rapidly or quickly adjust the machine to suit the varying lengths of the slabs of clay as they issue from time to time, from the pug-mill molding die or exit orifice and thus avoid the wasting of clay by the slabs of clay shooting out too far beyond the cutting wires 34, 34' and so on.

The advantages of the gages 35 and 35' are in the fact that by keeping them as near together as possible so as to make the portion of the cutting wires 34, 34' and so on, that cut the clay as short and thus as stiff as possible, and at the same time, at exactly the desired distance apart, thus making all the bricks of an even width or thickness.

In other machines they do not use any gage to keep the cutting wires evenly spaced, but rely wholly upon the eye bolts to which they are fastened to keep the cutting wires properly spaced. In practice I find that these eye bolts frequently get bent enough to prevent the cutting wires from being evenly spaced and consequently the bricks are of uneven thickness.

The roller 21 is only to use when the operator wishes to disconnect the table 23, from the pug-mill molding die or exit orifice 22 to change or clean it, when the operator simply slides the table 23 longitudinally along upon the said roller 21 temporarily.

These machines may also be built of iron or steel instead of wood.

Having fully described my invention, what I claim, and desire to secure by Letters Patent, is—

1. In a brick cutting machine the combination with the cutting wires 34 of the gages 35 provided with V slots or grooves to receive the cutting wires 34, all substantially as shown and described and for the object set forth.

2. In a brick cutting machine, the combination of the knife 26, the shaft 24 journaled in the main frame, the spring 27, the collar 28, with the table 23, all substantially as shown, described, and for the object set forth.

3. In a brick cutting machine, the combination of the lever 42, the connecting rods 43, 44, 45 and 46, the plunger 37, the guide rods 38, the shaft 39 all properly fastened and journaled together and operating to move the plunger 37 transversely upon the table 23, with the table 23, the cutting wires 34, and the gages 35, all substantially as shown, described, and for the object set forth.

4. The combination, in a brick cutting machine, of the lever 42, the connecting-rods 43, 44, 45, and 46, the plunger 37, the guide rod 38, the shaft 39, all properly fastened and journaled together and operating to move the plunger 37 transversely upon the table 23, the shaft 24 properly journaled in the frame timbers 2 and 3, the knife 26, the block 25, the spring 27, and the collar 28, all arranged together and operating to travel transversely upon the table 23, with the cutting wires 34, the gages 35, and the table 23 securely fastened to the pug-mill or molding die, and all except the table 23 operating to travel back and forth longitudinally upon the rails 17 and 17', all substantially as shown, described, and for the object set forth.

JOHN C. SCHROEDER.

Witnesses:
 GEO. M. BURR,
 RICHARD L. FROST.